(12) United States Patent
Pakkan et al.

(10) Patent No.: US 12,066,135 B2
(45) Date of Patent: Aug. 20, 2024

(54) HEATING OF SUBSEA PIPELINES

(71) Applicant: Subsea 7 Norway AS, Stavanger (NO)

(72) Inventors: Meric Pakkan, Stavanger (NO); Per Moi, Bryne (NO)

(73) Assignee: SUBSEA 7 NORWAY AS, Stavanger (NO)

( * ) Notice: Subject to any disclaimer, the term of this patent is extended or adjusted under 35 U.S.C. 154(b) by 613 days.

(21) Appl. No.: 17/299,771

(22) PCT Filed: Dec. 3, 2019

(86) PCT No.: PCT/EP2019/083558
§ 371 (c)(1),
(2) Date: Jun. 3, 2021

(87) PCT Pub. No.: WO2020/115079
PCT Pub. Date: Jun. 11, 2020

(65) Prior Publication Data
US 2022/0018230 A1   Jan. 20, 2022

(30) Foreign Application Priority Data
Dec. 4, 2018  (GB) ...................................... 1819751

(51) Int. Cl.
*F16L 53/32*       (2018.01)
*E21B 43/01*       (2006.01)
(Continued)

(52) U.S. Cl.
CPC .............. *F16L 53/32* (2018.01); *E21B 43/01* (2013.01); *F17D 1/18* (2013.01); *F16L 9/19* (2013.01)

(58) Field of Classification Search
CPC ........................................................ F17D 1/18
See application file for complete search history.

(56) References Cited

U.S. PATENT DOCUMENTS 5,979,506 A * 11/1999 Aarseth ..................... F16L 9/19
138/33
6,139,644 A * 10/2000 Lima ....................... E21B 43/01
134/8
(Continued)

FOREIGN PATENT DOCUMENTS

| WO | WO 99/19661 | 4/1999 |
| WO | WO 02/16732 | 2/2002 |

(Continued)

*Primary Examiner* — Robert K Arundale
*Assistant Examiner* — Richard K. Durden
(74) *Attorney, Agent, or Firm* — MATTINGLY & MALUR, PC (57) ABSTRACT

A technique mitigates or removes a plug of solid-state material such as wax or hydrate coalesced from hydrocarbon fluids in a subsea flowline pipe. In a normal flow mode, a flow of hot production fluids directed from a subsea well into a production flowline pipe extending toward a processing or storage location. Simultaneously, a contra-flow of service fluid such as monoethylene glycol (MEG) is transported along a service fluid pipe extending along and adjacent the production flowline pipe. The service fluid is injected into the well or flow of production fluid upstream of the flowline pipe. On determining plugging or a risk of plugging of the flowline pipe, a heating mode is activated wherein at least some of the flow of the production fluid is diverted into the service fluid pipe. This heats the service fluid pipe which, in turn, heats the flowline pipe to disperse the solid-state material.

29 Claims, 4 Drawing Sheets

(51) Int. Cl.
*F17D 1/18* (2006.01)
*F16L 9/19* (2006.01)

(56) References Cited

U.S. PATENT DOCUMENTS

| | | |
|---|---|---|
| 6,213,157 B1 | 4/2001 | Thiebaud et al. |
| 6,564,011 B1 | 5/2003 | Janoff et al. |
| 6,939,082 B1 * | 9/2005 | Baugh .................. B08B 7/0071 405/145 |
| 7,100,694 B2 | 9/2006 | Legras et al. |
| 7,721,807 B2 | 5/2010 | Stoisits et al. |
| 8,220,552 B2 | 7/2012 | Kinnari et al. |
| 8,430,169 B2 | 4/2013 | Stoisits et al. |
| 8,469,101 B2 | 6/2013 | Fowler et al. |
| 8,950,499 B2 * | 2/2015 | Critsinelis ............... E21B 17/01 166/344 |
| 9,303,488 B2 | 4/2016 | Kanstad |
| 10,711,935 B2 | 7/2020 | Settouti et al. |
| 2006/0175062 A1 | 8/2006 | Benson |
| 2010/0252260 A1 * | 10/2010 | Fowler .................... E21B 43/01 166/275 |
| 2010/0300486 A1 * | 12/2010 | Hoffman ................ B08B 9/027 702/170 |
| 2012/0103431 A1 | 5/2012 | Casey et al. |
| 2015/0184490 A1 * | 7/2015 | Kanstad .............. E21B 41/0007 166/335 |
| 2017/0336010 A1 * | 11/2017 | Settouti ................ E21B 43/017 |
| 2019/0003293 A1 * | 1/2019 | Kanstad ................ E21B 43/255 |

FOREIGN PATENT DOCUMENTS

| | | |
|---|---|---|
| WO | WO 02/063128 | 8/2002 |
| WO | WO 02/092961 | 11/2002 |
| WO | WO 2009/042319 | 4/2009 |
| WO | WO 2011/144828 | 11/2011 |
| WO | WO 2014/009385 | 1/2014 |
| WO | WO 2016/066967 | 5/2016 |
| WO | WO 2018/007299 | 1/2018 |

* cited by examiner

HEATING OF SUBSEA PIPELINES

This invention relates to heating of subsea pipelines that are used in the production of hydrocarbon fluid. The objective of heating is to avoid a pipeline becoming clogged or plugged with solids that may otherwise appear in the fluid if its temperature falls too low within a given pressure range.

Oil and gas are present in subterranean formations at elevated temperature and pressure, which may be increased by the injection of fluids such as pressurised water. On production of oil or gas from subsea fields, the hot production fluid emerges from a subsea wellhead and enters a subsea pipeline in a multiphase state. The production fluid then flows in the pipeline across the seabed and eventually flows up a riser to the surface.

Low temperature increases the viscosity of the production fluid and promotes coalescence or precipitation of solid-phase materials from some components present in the production fluid, namely waxes and asphaltenes in crude oil and hydrates in natural gas. Such solid-phase materials tend to deposit and accumulate on the inner wall of the pipeline and may eventually cause plugs, which will interrupt production. Aside from the high cost of lost production, plugs are difficult and expensive to remove and can even sever a pipeline.

During transportation along a pipeline, the temperature and pressure of the production fluid have to be kept high enough to ensure a sufficient flow rate across the seabed and up a riser. In particular, various measures are taken to ensure that the internal temperature of the pipeline remains high, typically above 65° C. and in some cases above 200° C., despite thermal exchange with seawater which, for example, is at 4° C. below 1000 m depth.

Maintaining a sufficient temperature in a flow of hydrocarbons is straightforward while the hot flow continues but it becomes critical during a shutdown period. In this respect, all or part of a subsea oil or gas field must occasionally be shut down for maintenance. Shutdown may also occur on an unplanned basis in the event of an equipment failure or other anomaly. During shutdown, production is stopped and therefore hot production fluid no longer flows through the pipeline.

If the flow of production fluid stops for any reason, the temperature of the fluid left within the pipeline will decrease due to thermal exchange with the much colder surrounding seawater. Plugging becomes a risk if the temperature of the production fluid within the pipeline drops below the wax appearance temperature (WAT), or below other thresholds at which other solid materials will coalesce from oil or gas. Also, when production restarts, temperature within the pipeline must be increased quickly so that no plugs will form.

WO 2014/009385 teaches locally reducing pressure in a pipeline to a level that is sufficient to melt hydrate plugs. However, this solution can only be useful once such plugs have already formed and, in any event, is not efficient against any type of plug.

To avoid clogging by solid-phase materials, mitigating or displacement fluids such as methanol or diesel oil may be injected into a production pipeline during a shutdown. Alternatively, chemicals such as hydrate inhibitors as disclosed in US 2012/103431 or phase-change materials as disclosed in US 2013/025873 can be injected into the pipeline. Similarly, WO 2009/042319 describes the use of a combination of varying pressure and injecting displacement fluids, such as dead crude or diesel containing a hydrate inhibitor.

In U.S. Pat. No. 7,721,807, service lines that transport service fluids to wellheads are used to transport remediation and inhibition chemicals and to reinject those chemicals into the production fluid at the wellhead or into a manifold close to the wellhead. For example, dead crude or methanol may be circulated through the service lines.

Subsequently, when restarting production, mitigating fluids or other chemicals must be removed from a production pipeline. Typically this involves pushing them out of the pipeline ahead of a pig propelled by incoming production fluid, as explained in U.S. Pat. No. 8,469,101.

In U.S. Pat. No. 8,220,552, a gas is injected to raise the pressure threshold for hydrate formation, thereby to reduce the likelihood that solid-phase materials will appear.

Disadvantageously, all of the above mitigation measures require the presence of specific equipment and storage facilities aboard a topside production installation.

Another approach to flow assurance is to manage the temperature of a pipeline. Designers of subsea pipelines have adopted both passive and active approaches to thermal management, both individually and in combination.

In passive thermal management systems, a pipeline is thermally insulated. One example of a passive system is a pipe-in-pipe (PiP) structure comprising a fluid-carrying inner pipe positioned concentrically within an outer pipe. The inner and outer pipes are spaced from each other to define an insulating annulus between them. Typically, insulating material is disposed in the annulus; it is also possible to draw down a partial vacuum in the annulus to reduce transmission of heat through the annulus.

Among active thermal management systems, a trace heating system typically employs resistive electrical wires running along, and in thermal contact with, the outer surface of a steel pipeline. Heat produced by passing an electric current along the wires is conducted through the pipe wall to the production fluid flowing within. An example of an electrically trace-heated flowline pipe is disclosed in WO 02/16732.

Direct electrical heating of pipelines is also common, as is circulation of hot water in tubes close to pipelines as disclosed in WO 99/19661. However these active heating solutions require dedicated heating systems to be installed with the pipeline, even if those systems will only be operational during shutdown. In another approach, removable heating stations are shown in WO 2016/066967.

Proximity between multiple parallel production pipelines of a bundle can be exploited to use heat emanating from active pipelines of the bundle to maintain the temperature of another of those pipelines when it is shut down, as taught by WO 2011/144828. However this solution is useless if all or most of the pipelines are shut down simultaneously, for example because of topside maintenance.

US 2010/0252260 relates to a method of managing hydrate formation in subsea equipment using a hydrate inhibitor.

In U.S. Pat. No. 6,213,157, flow lines carrying production fluid are heated by neighbouring flow lines carrying heating fluid, all of which are enclosed in a thermally insulating buoyancy module.

US 2017/0336010 describes methods of managing the heating of fluids flowing in an underwater pipe network, in which at least one fluid heater station is releasably connected to a pipe to be heated.

Against this background, the invention provides a method of maintaining production of hydrocarbon fluids subsea. The method comprises: directing a flow of hot production fluid from a subsea well into at least one production flowline pipe that extends toward a processing or storage location; transporting a flow of service fluid from a source of the service fluid along at least one service fluid pipe that extends along and adjacent to the production flowline pipe; injecting the service fluid from the service fluid pipe into the well or into the flow of production fluid upstream of the flowline pipe; diverting at least some of the flow of the production fluid into the service fluid pipe to apply heat from the production fluid to the service fluid pipe; and transferring the heat from the service fluid pipe to the flowline pipe.

The production fluid may be directed from the service fluid pipe to the processing or storage location after the production fluid has flowed along the service fluid pipe. This may be in response to tracking the progress of an interface between the service fluid and the production fluid in the service fluid pipe.

The service fluid may be displaced from the service fluid pipe by the production fluid flowing into the service fluid pipe. Conveniently, the service fluid displaced from the service fluid pipe may be recovered back to the source of the service fluid.

At least some of the flow of the production fluid may be diverted into the service fluid pipe in response to plugging or expected plugging of the flowline pipe. For example, diversion may be in response to shutdown or impending shutdown of the flowline pipe, or in response to the temperature or flowrate of the production fluid in the flowline pipe falling below a threshold value.

Eventually, diversion of the flow of the production fluid into the service fluid pipe may be stopped. All of the flow of the production fluid may then be directed into the at least one flowline pipe. For example, diversion may be stopped in response to temperature or flowrate of the production fluid in the flowline pipe exceeding a threshold value, indicating that a plug has dispersed.

The service fluid may conveniently be used to flush the production fluid from the service fluid pipe. In that case, the flushed production fluid may be injected from the service fluid pipe into the well or into the flow of production fluid upstream of the flowline pipe.

Heat may, for example, be transferred from the service fluid pipe to the flowline pipe within a thermally-insulated enclosure that surrounds the service fluid pipe and the flowline pipe.

The inventive concept embraces a subsea hydrocarbon production system for implementing the method of the invention. The system of the invention comprises: at least one production flowline pipe for transporting a flow of hot production fluid from a subsea well upstream of the production flowline pipe toward a processing or storage location; at least one service fluid pipe extending parallel to and adjacent to the production flowline pipe, and in sufficiently close thermally-coupled proximity with the production flowline pipe such that heat can be transferred between the service fluid pipe and the production flowline pipe, for transporting a service fluid from a source of the service fluid toward an injection point upstream of the flowline pipe; and a flow diverter upstream of the flowline pipe, the flow diverter being configured selectively to divert at least some of the flow of production fluid into the service fluid pipe to apply heat to the flowline pipe via the service fluid pipe.

The flowline pipe and the service fluid pipe are suitably disposed within, and share, a thermally-insulated enclosure. Such an enclosure may comprise a thermally insulating material that encapsulates the flowline pipe and the service fluid pipe. The enclosure may comprise an outer pipe that surrounds the flowline pipe and the service fluid pipe, and may contain a fluid in thermally-transmitting contact with the flowline pipe and the service fluid pipe.

A recovery system may be provided between the service fluid pipe and the source of the service fluid for recovering the production fluid from the service fluid pipe. Such a recovery system may comprise a cross-over path for diverting production fluid from the service fluid pipe toward the processing or storage location.

A valve may be provided between the cross-over path and the source of the service fluid, the valve being configured to prevent production fluid from the service fluid pipe flowing to the source. Such a valve may, however, be switchable to allow service fluid displaced from the service fluid pipe by the production fluid to return to the source.

The system of the invention preferably further comprises a controller that is programmed to activate the flow diverter in response to plugging or expected plugging of the flowline pipe. For example, the controller may be programmed to activate the flow diverter in response to shutdown or impending shutdown of the flowline pipe, or in response to temperature or flowrate of the production fluid in the flowline pipe falling below a threshold value. Conversely, the controller may be programmed to deactivate the flow diverter in response to temperature or flowrate of the production fluid in the flowline pipe exceeding a threshold value.

The flow diverter is suitably located in a subsea wellhead or manifold upstream of the flowline pipe. The source of the service fluid and the processing or storage location are suitably situated on a surface installation. The flowline pipe and the service fluid pipe are suitably laid on the seabed.

The invention achieves a heating effect that is similar to that of known thermal management systems but it uses minimal additional equipment in order to do so. An advantage of the invention is that it requires only one extra valve at a wellhead or in a production manifold upstream of the production pipeline. In particular, installation and operation of the invention does not require a dedicated active heating system and/or major topside modifications.

In an example of the invention, an outer or carrier pipe in a production PiP or bundle system has at least two lines inside, at least one being a main production line used to carry regular production fluids and at least one other being a service line. For example, the service line may be filled with monoethylene glycol (MEG) during normal operation for use in preventing the formation of hydrates in the production fluid flowing in the main production line.

During shutdown, the main production line may cool to beneath the critical temperature, in which case it may become plugged with solid-phase materials and so may be impossible to start again without first applying heat. In that case, or in advance of shutdown, at least some of the flow of hydrocarbons may be diverted from the main production line into the service line that was previously filled with MEG so as to restart or to maintain production.

Heat emanating from the service line as a result of the hot production fluid flowing through it is transferred to the main production line, mainly by conduction. This raises the temperature of the main production line so that production fluid can flow through it again as soon as its temperature has risen to a high enough or required level. After this, the service line can be filled with MEG again so as to be ready for the next shutdown whenever that may occur. The service line therefore serves not just as a MEG line, in this example, but also temporarily as a contingency or heating line.

Embodiments of the invention provide a subsea oil or gas production system that comprises: at least one well producing a fluid, which fluid may be multiphasic; at least one pipeline for transporting said fluid from the well; at least one service line close to the production pipeline for transporting service fluids; and at least one valve between the well and the pipeline inlet that allows diversion of produced fluid into the service line. Another valve may be located topside to recover production fluid from the service line.

The service line may be bundled with the production pipeline, piggy-backed onto the production pipeline, enclosed in the same casing and/or encapsulated in the same thermally insulating material as the production pipeline.

Embodiments of the invention implement a method to heat a subsea oil and gas pipeline, for example during pipeline shutdown. That method comprises the steps of: selecting a service line close to the shut-down production pipeline; diverting, at least partially, production fluid into the service line; and when the content of the production pipeline reaches a sufficient temperature, stopping diversion of production fluid to the service line. The service line may then be flushed with a service fluid.

In summary, the invention provides a system and method for mitigating or removing a plug of solid-state material coalesced from hydrocarbon fluids in a subsea flowline pipe.

In a normal flow mode, a flow of hot production fluid is directed from a subsea well into a production flowline pipe that extends toward a processing or storage location. Simultaneously, a contra-flow of service fluid such as MEG is transported along a service fluid pipe that extends along and adjacent to the production flowline pipe. The service fluid is injected into the well or into the flow of production fluid upstream of the flowline pipe.

On determining plugging or a risk of plugging of the flowline pipe, a heating mode is activated in which at least some of the flow of the production fluid is diverted into the service fluid pipe. This heats the service fluid pipe which, in turn, heats the flowline pipe to disperse the solid-state material.

In order that the invention may be more readily understood, reference will now be made, by way of example, to the accompanying drawings in which.

Figure 1:
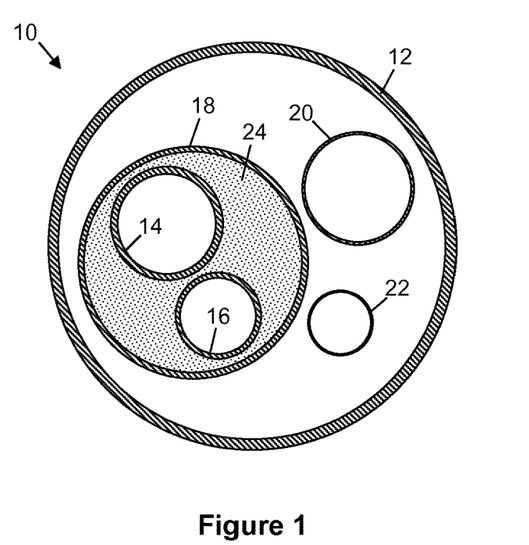
FIG. 1 is a schematic cross-sectional view of a pipeline bundle to which the invention may be applied.

Referring firstly to FIG. 1, this cross-sectional drawing shows a pipeline bundle 10 that comprises a continuous rigid carrier pipe 12. The ends of the carrier pipe 12 are typically closed by bulkheads (not shown) to enclose a sealed hollow gas-filled chamber within the carrier pipe 12. However it is also possible for the carrier pipe 12 to be flooded with water in use.

The carrier pipe 12 contains various parallel pipes, namely:

a rigid flowline pipe 14 to carry multiphasic hydrocarbon production fluids comprising oil and/or gas;

a service fluid pipe 16 for conveying a service fluid such as MEG for injection into the flow of production fluids, at an injection point upstream of the flowline pipe 14;

an outer production pipe 18 that surrounds the flowline pipe 14 and the service fluid pipe 16;

a water injection pipe 20; and a gas lift pipe 22.

A body of thermal insulation material 24 within the outer production pipe 18 embeds or encapsulates and surrounds the flowline pipe 14 and the service fluid pipe 16. The flowline pipe 14 and the service fluid pipe 16 are therefore located in a shared thermally-insulated space within the thermal insulation material 24, which retains heat in and between those pipes 14, 16.

The flowline pipe 14 and the service fluid pipe 16 are in close proximity to each other such that there is only a minimal thickness of thermal insulation material 24, if any, between them. This promotes transfer of heat between the service fluid pipe 16 and the flowline pipe 14, as will be explained.

The water injection pipe 20 and the gas lift pipe 22 are disposed in a gap between the outer surface of the production pipe 18 and the inner surface of the carrier pipe 12, hence outside the thermal insulation material 24 within the production pipe 18.

By way of example, the flowline pipe 14 may have an inner diameter of twelve inches (304.8 mm) and the service fluid pipe 16 may have an inner diameter of eight inches (203.2 mm). However, these dimensions and relative sizes are not essential and can be varied. For example, the service fluid pipe 16 could have a similar inner diameter to the flowline pipe 14.

The carrier pipe 12 and the various other pipes 14-22 within it are typically of steel but some could be largely of composite materials. Additional layers or components can be added to any of the pipes 12-22, such as an internal liner or an outer coating. Such additional layers or components can comprise polymer, metal or composite materials. However, it is preferred that the flowline pipe 14 and the service fluid pipe 16 are metallic for high thermal conductivity. It is also preferred that any layers or components added to the flowline pipe 14 and the service fluid pipe 16 are also metallic, or at least thin, so as to have minimal thermally insulating effect.

Most of the pipes 12-22 of the bundle 10 are single-walled but some may be of double-walled pipe-in-pipe (PiP) construction. For example, the outer pipe 18 could be of PiP construction to provide additional thermal insulation, so as to retain heat around the flowline pipe 14 and the service fluid pipe 16 disposed within. Again, it is preferred that the flowline pipe 14 and the service fluid pipe 16 are of single-walled construction for high thermal conductivity through their walls.

Although omitted from this simplified view, other elongate elements such as cables will typically be included in the bundle 10, extending in parallel with the pipes 14-22 within the carrier pipe 12 to carry power and data signals along the bundle 10. Also omitted are the longitudinally-distributed transverse spacers that will typically hold the pipes 14-22 and other elongate elements in their positions within the carrier pipe 12 and relative to each other. Such spacers may also facilitate insertion of the pipes 14-22 and other elongate elements into the carrier pipe 12 during fabrication of the bundle 10.

Figure 2:
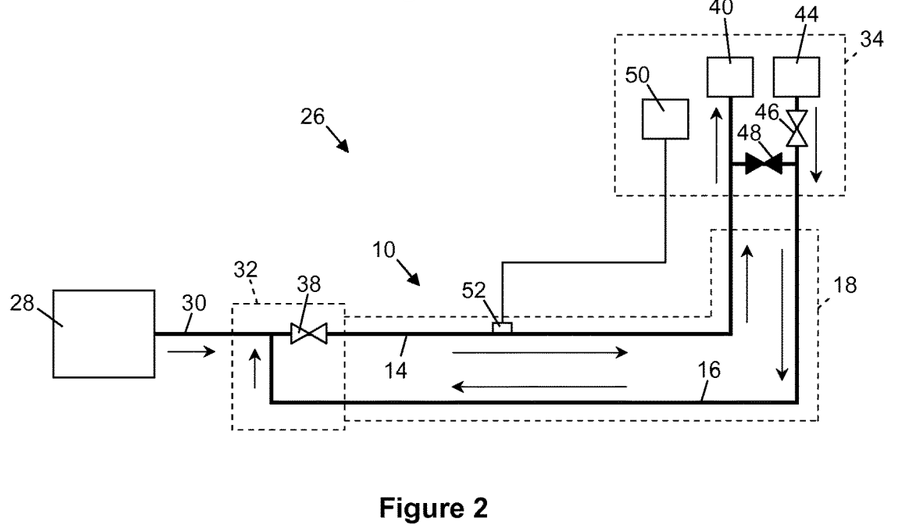
FIG. 2 is a simplified diagram of a subsea hydrocarbon production system incorporating the pipeline bundle of FIG. 1, in a normal flow mode.
Figure 3:
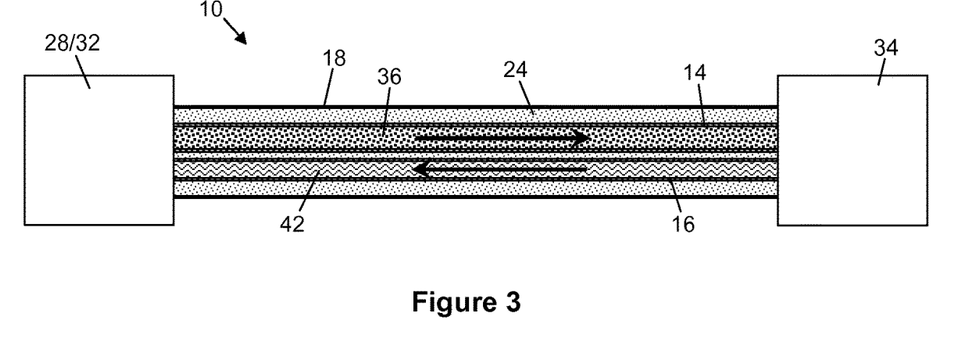
FIG. 3 is a schematic longitudinal sectional view of a production line and a service line of the bundle of FIG. 1, in the normal flow mode shown in FIG. 2.
Figure 4:
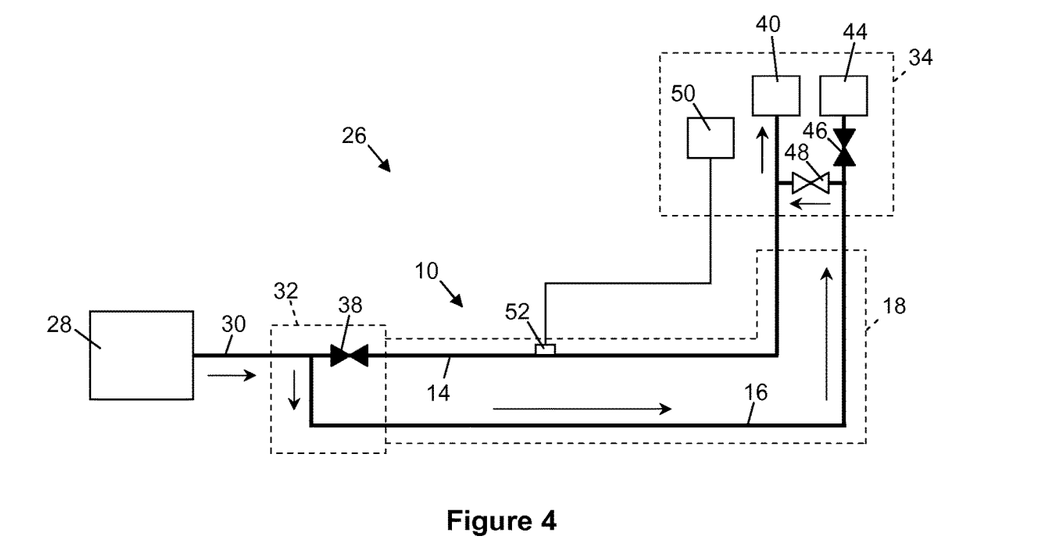
FIG. 4 corresponds to FIG. 2 but shows the system in a heating mode in which production fluid is diverted along the service line to bypass the production line.
Figure 5A:
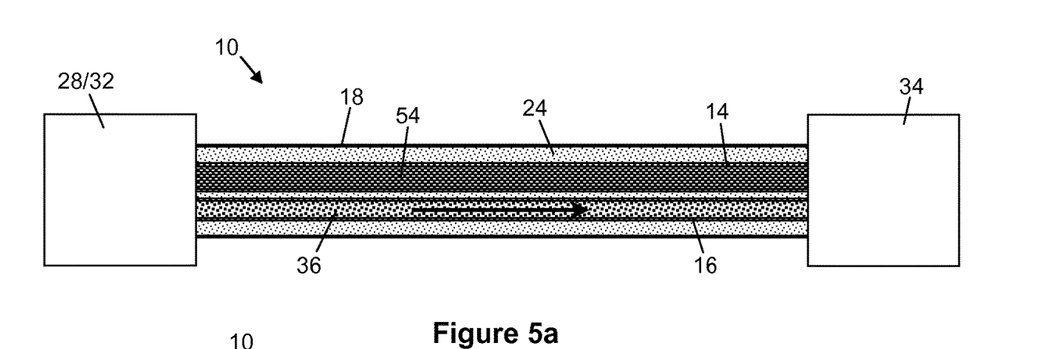
FIGS. 5a and 5b correspond to FIG. 3 but show, respectively, a blockage in the production line and the effect of heat from the service line to clear the blockage when in the heating mode.
Figure 5B:
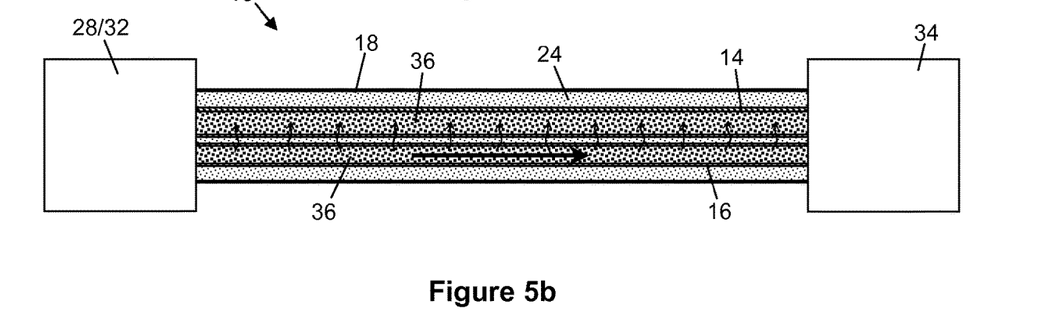
Figure 6:
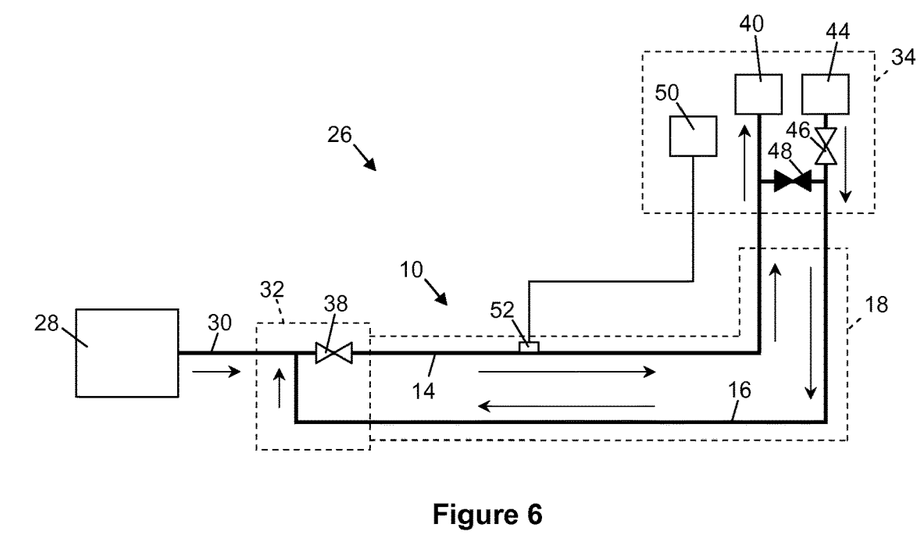
FIG. 6 corresponds to FIG. 4 but shows the system returning to the normal flow mode of FIG. 2.

FIGS. 2 to 7 show how the pipeline bundle 10 of FIG. 1 may be controlled for the purpose of flow assurance in accordance with the invention. Specifically, FIGS. 2, 4 and 6 are simplified system diagrams that show a subsea hydrocarbon production system 26 of the invention incorporating the bundle 10, in various modes of operation. Conversely, FIGS. 3, 5*a*, 5*b* and 7 show fluids within the flowline pipe 14 and the service fluid pipe 16 of the bundle 10 in the corresponding modes of operation. FIG. 5*b* also shows a flow of heat from the service fluid pipe 16 to the flowline pipe 14 when the system 26 is in a heating mode.

The system 26 of FIGS. 2, 4 and 6 comprises a subsea well 28 that is connected by a flying lead or jumper pipe 30 to a subsea manifold 32. The bundle 10 extends from the manifold 32 to a topside installation 34, initially as a subsea pipeline extending across the seabed and then as a riser extending above the seabed. For example, the topside installation 34 may be a platform or a floating unit such as a floating production unit (FPU) or a floating production storage and offloading (FPSO) vessel.

Among the various pipes of the bundle 10, only the flowline pipe 14, the service fluid pipe 16 and the outer production pipe 18 that surrounds them are shown in FIGS. 2 to 7. FIGS. 3, 5*a*, 5*b* and 7 additionally show the thermal insulation material 24 within the outer production pipe 18.

In a normal mode of operation shown in FIGS. 2 and 3, the flowline pipe 14 carries a hydrocarbon production fluid 36, as shown in FIG. 3, from the manifold 32 to the topside installation 34. The production fluid 36 flows through an open control valve 38 upstream of the flowline pipe 14. The topside installation 34 receives the production fluid 36 flowing from the flowline pipe 14 into a processing and storage system 40, as shown in FIG. 2.

Conversely, the service fluid pipe 16 carries a service fluid 42 such as MEG, as shown in FIG. 3. The service fluid 42 is pumped from a source such as a reservoir 44 at the topside installation 34 and through an open control valve 46 upstream of the service fluid pipe 16 to the manifold 32, as shown in FIG. 2. In the manifold 32, the service fluid 40 is injected from the service fluid pipe 16 into the flow of production fluid 36 upstream of the flowline pipe 14.

Thus, in the normal flow mode, there is a contra-flow of fluids within the outer production pipe 18 of the bundle 10, in that the flow of service fluid 40 in the service fluid pipe 16 is opposed in direction to the flow of production fluid 36 in the flowline pipe 14.

Other than where the service fluid 42 is injected into the production fluid 36, the flow paths through the flowline pipe 14 and the service fluid pipe 16 are kept separate in the normal flow mode. A crossover valve 48 in the topside installation 34 between the flowline pipe 14 and the service fluid pipe 16 is therefore closed.

As is customary, the valves 38, 46, 48 are shown in FIGS. 2, 4 and 6 as white when open and as black when closed.

FIGS. 2, 4 and 6 also show a control system 50 in the topside installation that receives signals from sensors 52 on the flowline pipe 14. The sensors 52 may, for example, measure the temperature, flow rate and composition of the production fluid 36 flowing along the flowline pipe 14. Among other control inputs, the control system 50 responds to signals from the sensors 52 to control the operation of the production system 26.

Moving on now to FIGS. 4, 5*a* and 5*b*, these drawings show a second, heating mode of operation of the production system 26. In the heating mode, the service fluid pipe 16 applies heat to the exterior of the flowline pipe 14 and hence, by thermal conduction, to production fluid 36 within the flowline pipe 14.

The heating mode is initiated in response to a shutdown of the flow of production fluid 36 in the flowline pipe 14. The stationary body of production fluid 36 remaining in the flowline pipe 14 therefore loses heat to seawater surrounding the pipeline bundle 10. Over time, the temperature of that residual body of production fluid 36 may fall below thresholds at which solid-phase compounds will coalesce, such as the wax appearance temperature. The flowline pipe 14 shown in FIG. 5*a* has therefore been blocked by a solid plug 54, or there is a risk that such a plug 54 is about to form.

Plugging of the flowline pipe 14, or a risk of plugging, may be inferred from lapse of time after a shutdown commences. Plugging, or a risk of plugging, may also be detected by the sensors 52, based on a reduction in the measured temperature and/or flowrate of the production fluid 36 in the flowline pipe 14.

It is not necessary to wait until the plug 54 has formed before taking remedial, preventative or precautionary action by initiating the heating mode. The control system 50, or an operator, can deduce the appearance of plugging conditions from temperature and/or flowrate and/or pressure of the production fluid 36 and so can decide to change the operational configuration accordingly.

In response to plugging or a risk of plugging, the production system 26 switches into the heating mode by diverting the wellstream of hot production fluid 36 from the well 28 or manifold 32 into the service fluid pipe 16. To do so, the control valve 38 upstream of the flowline pipe 14 is closed, forcing the production fluid 36 into the service fluid pipe 16. The incoming production fluid 36 displaces the service fluid 42 back into the reservoir 44 through the control valve 46, which initially remains open. A pig may be propelled at the front of the incoming body of production fluid 36 at the interface between the production fluid 36 and the service fluid 42. The progress of the interface along the service fluid pipe 16 may be monitored by the control system 50.

Before the production fluid 36 reaches the reservoir 44, the control valve 46 between the reservoir 44 and the service fluid pipe 16 is closed and the crossover valve 48 is opened, as shown in FIG. 4. This directs the production fluid 36 into the processing and storage system 40 of the topside installation 34.

Diverting the production fluid 36 through the service fluid pipe 16 in this way has the benefit of maintaining some flow of production fluid 36 in the event that the flowline pipe 14 is shut down, plugged or otherwise incapacitated. However the main benefit of the invention is that the heat of the production fluid 36 flowing in the service fluid pipe 16 is transferred to the flowline pipe 14 to raise its temperature and thereby to mitigate plugging. In this respect, FIG. 5*b* shows heat flowing from the service fluid pipe 16 into the flowline pipe 14. By virtue of that transfer of heat, the plug 54 of FIG. 5*a* has been melted back into the fluid state in FIG. 5*b* and so is shown again as production fluid 36.

Figure 7:
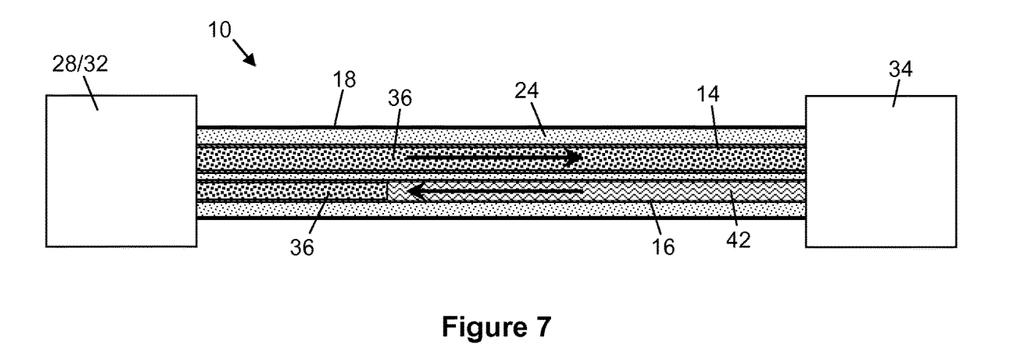
FIG. 7 corresponds to FIG. 5b but shows a service fluid such as MEG displacing production fluid from the service line.

When the sensors 52 determine that the temperature or flowrate in the flowline pipe 14 is sufficient to infer that the plug 54 has dispersed, the production system 26 can return to the normal mode shown in FIGS. 6 and 7. The control valve 38 upstream of the flowline pipe 14 is reopened, allowing the hot incoming production fluid 36 to enter the flowline pipe 14 again. The crossover valve 48 is closed, ensuring that the flow of production fluid 36 from the flowline pipe 14 is directed into the processing and storage system 40 of the topside installation 34.

The service fluid pipe 16 must now be returned to its primary purpose of supplying the service fluid 42 for injection into the flow of production fluid 36 in the flowline pipe 14. The service fluid pipe 16 must therefore be purged of the residual production fluid 36 that it contains. To do so, the control valve 46 between the reservoir 44 and the service fluid pipe 16 is reopened and the service fluid 42 is pumped from the reservoir 44 into and along the service fluid pipe 16. This forces the residual production fluid 36 from the service fluid pipe 16 and into the flowline pipe 14.

FIG. 7 shows the service fluid 42 displacing the residual production fluid 36 from the service fluid pipe 16. The mobile interface between the incoming service fluid 42 and the outgoing production fluid 36 in the service fluid pipe 16 is apparent. Again, a pig may be propelled at the front of the incoming body of service fluid 42 at the interface between the service fluid 42 and the production fluid 36. Such a pig may be a cleaning or scraping pig.

Figure 8:
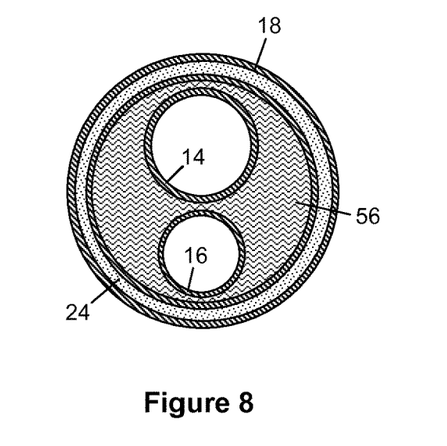
FIGS. 8, 9 and 10 are schematic cross-sectional views of variants of the invention.

Turning now to FIG. 8 of the drawings, the outer production pipe 18 of the variant shown here is of thermally-insulating PiP construction and has thermal insulation 24 disposed in its annulus. Within the outer production pipe 18, the flowline pipe 14 and the service fluid pipe 16 are both immersed in a body of a heat-transmitting fluid 56, preferably a liquid such as water or kerosene.

The fluid 56 effects thermal coupling between the flowline pipe 14 and the service fluid pipe 16 within their shared volume that is thermally insulated by the surrounding outer production pipe 18. The fluid 56 transmits heat from the service fluid pipe 16 to the flowline pipe 14 by various heat transfer mechanisms of conduction, convection and radiation. The fluid 56 also increases thermal inertia and so delays cooling of the flowline pipe 14 during a shutdown.

Figure 9:
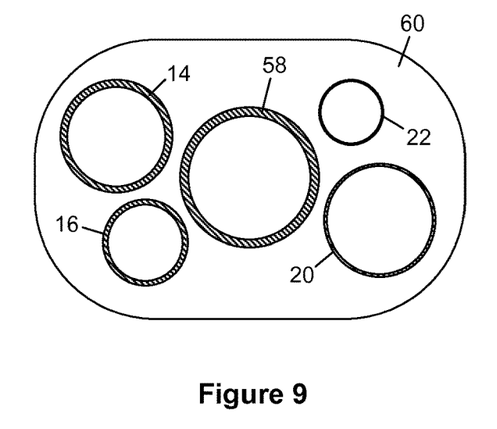
Figure 10:
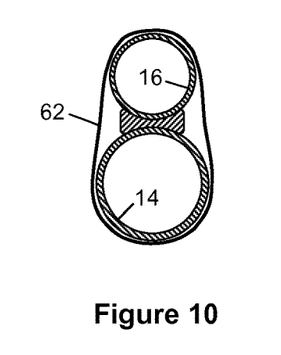

In a broad sense, it is not essential that the flowline pipe 14 and the service fluid pipe 16 are contained within a carrier pipe 12 or outer production pipe 18, so long as the flowline pipe 14 and the service fluid pipe 16 are in close thermally-coupled proximity to each other. For example, the pipes 14, 16, 20 and 22 of a bundle could be arranged around a structural core pipe 58 as shown in FIG. 9 and held together by a longitudinal series of retainer or support structures, such as transverse frames 60. Alternatively, the flowline pipe and 14 the service fluid pipe 16 could be piggybacked in a parallel arrangement and laid simultaneously, held together by a longitudinal series of clips, clamps or straps 62 that hold the pipes 14, 16 close together as shown in FIG. 10.

Figure 11:
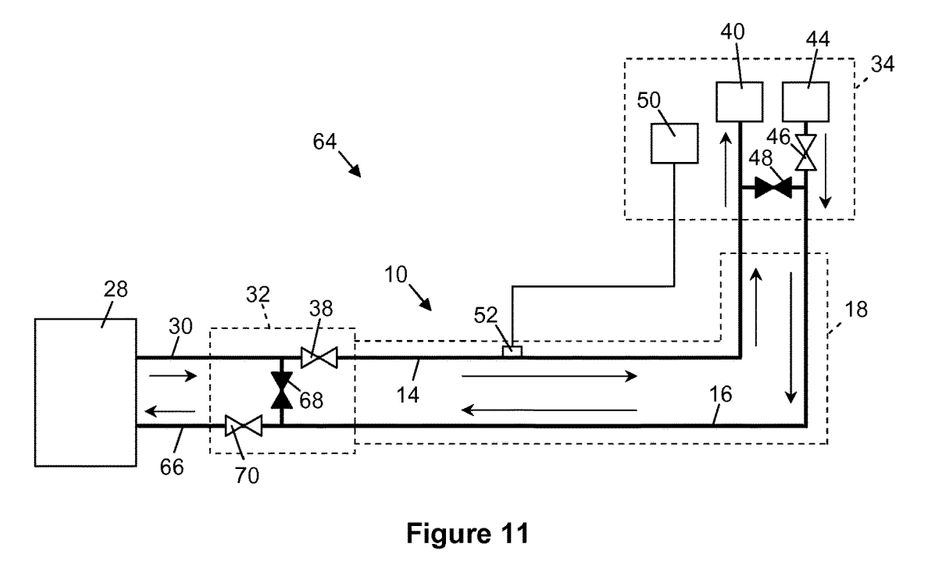
FIG. 11 is a simplified diagram of an alternative subsea hydrocarbon production system incorporating the pipeline bundle of FIG. 1, in a normal flow mode.

Turning finally to FIG. 11, this diagram shows an alternative subsea hydrocarbon production system 64 of the invention that incorporates a pipeline bundle 10. The system 64 is shown here in a normal flow mode. Like numerals are used for like features.

The system 64 shown in FIG. 11 differs from the system 26 shown in FIGS. 2, 4 and 6 in two main respects. Firstly, FIG. 11 illustrates that, in some embodiments, the service fluid 42 may be distributed from the service fluid pipe 16 into the subsea well 28, which is also upstream of the flowline pipe 14. For example, the service fluid 42 may be injected into the well 28 via an additional flying lead or jumper pipe 66 that extends between the manifold 32 and the well 28. Secondly, FIG. 11 illustrates that other valves may be present in the system 64 for operational purposes. In particular, FIG. 11 shows first and second isolation valves 68, 70 in the manifold 32.

The first isolation valve 68, which is closed in the normal flow mode shown in FIG. 11, is in a cross-over path between the flowline pipe 14 and the service fluid pipe 16. When closed in the normal flow mode, the first isolation valve 68 segregates the contra-flows of production fluid 36 and service fluid 42. Conversely, when opened in the heating mode, the first isolation valve 68 allows production fluid 36 diverted from the flowline pipe 14 to flow into the service fluid pipe 16.

The second isolation valve 70, which is open in the normal flow mode shown in FIG. 11, is disposed between the service fluid pipe 16 and the additional jumper pipe 66. When open in the normal flow mode, the second isolation valve 70 allows the service fluid 42 to flow along the additional jumper pipe 66 into the well 28. When closed in the heating mode, the second isolation valve 70 prevents the diverted production fluid 36 re-entering the well 28 along the additional jumper pipe 66.

Many other variations are possible without departing from the inventive concept. For example, the service fluid pipe could convey service fluids other than MEG. Also, a manifold is not essential to the operation of the invention. The service fluid could instead be injected into the production fluid in the wellhead and the production fluid could instead be diverted into the service fluid pipe at the wellhead.

More generally, the production fluid could be diverted into the service fluid pipe on a flowpath that is separate from the flowpath on which the service fluid is injected into the well, manifold or otherwise upstream of the flowline pipe.

Not all of the flow of production fluid needs to be diverted through the service fluid pipe. If the flowline pipe is not entirely blocked, the flow can instead be divided between the flowline pipe and the service fluid pipe. In other words, some of the production fluid flowing from the well or the manifold can be bled through the flowline pipe while the remainder is directed through the service fluid pipe.

The service fluid pipe preferably extends along the flowline pipe but it is not necessarily parallel to the flowline pipe. For example, the service fluid pipe could follow an undulating, serpentine or coiled path beside or around the flowline pipe so as to maximise thermal coupling with the flowline pipe.

The invention claimed is:

1. A method of maintaining production of hydrocarbon fluids subsea comprises;
   directing a flow of hot production fluid from a subsea well into at least one production flowline pipe that extends toward a processing or storage location;
   in a first mode of operation, transporting a flow of service fluid from a source of the service fluid along at least one service fluid pipe that extends along and adjacent to the production flowline pipe and, at least intermittently, injecting the service fluid from the service fluid pipe into the well or into the flow of production fluid upstream of the flowline pipe; and
   in a second mode of operation, diverting at least some of the flow of the production fluid into the service fluid pipe to apply heat from the production fluid to the service fluid pipe, and transferring the heat from the service fluid pipe to the flowline pipe.

2. The method of claim 1, further comprising directing the production fluid from the service fluid pipe to the processing or storage location after the production fluid has flowed along the service fluid pipe.

3. The method of claim 2, comprising directing the production fluid from the service fluid pipe to the processing or storage location in response to progress of an interface between the service fluid and the production fluid in the service fluid pipe.

4. The method of claim 1, comprising displacing the service fluid from the service fluid pipe by the production fluid flowing into the service fluid pipe.

5. The method of claim 4, comprising recovering the service fluid displaced from the service fluid pipe back to the source of the service fluid.

6. The method of claim 1, comprising diverting at least some of the flow of the production fluid into the service fluid pipe in response to plugging or expected plugging of the flowline pipe.

7. The method of claim 4, comprising diverting at least some of the flow of the production fluid into the service fluid pipe in response to shutdown or impending shutdown of the flowline pipe.

8. The method of claim 6, comprising diverting at least some of the flow of the production fluid into the service fluid pipe in response to temperature or flowrate of the production fluid in the flowline pipe falling below a threshold value.

9. The method of claim 1, further comprising stopping diversion of the flow of the production fluid into the service fluid pipe and directing all of the flow of the production fluid into the at least one flowline pipe.

10. The method of claim 9, comprising stopping diversion of the flow of the production fluid in response to temperature or flowrate of the production fluid in the flowline pipe exceeding a threshold value.

11. The method of claim 9, comprising flushing the production fluid from the service fluid pipe with the service fluid.

12. The method of claim 11, comprising injecting the flushed production fluid from the service fluid pipe into the well or into the flow of production fluid upstream of the flowline pipe.

13. The method of claim 1, comprising transferring the heat from the service fluid pipe to the flowline pipe within a thermally insulated enclosure that surrounds the service fluid pipe and the flowline pipe.

14. A subsea hydrocarbon production system, comprising:
at least one production flowline pipe for transporting a flow of hot production fluid from a subsea well toward a processing or storage location;
at least one service fluid pipe extending along and adjacent to the production flowline pipe for transporting a service fluid from a source of the service fluid toward an injection point upstream of the flowline pipe; and
a flow diverter upstream of the flowline pipe, the flow diverter being configured selectively to divert at least some of the flow of production fluid into the service fluid pipe to apply heat to the flowline pipe via the service fluid pipe.

15. The system of claim 14, wherein the flowline pipe and the service fluid pipe are disposed within, and share, a thermally insulated enclosure.

16. The system of claim 15, wherein the enclosure comprises a thermally insulating material that encapsulates the flowline pipe and the service fluid pipe.

17. The system of claim 15, wherein the enclosure comprises an outer pipe that surrounds the flowline pipe and the service fluid pipe.

18. The system of claim 15, wherein the enclosure contains a fluid in thermally transmitting contact with the flowline pipe and the service fluid pipe.

19. The system of claim 14, further comprising a recovery system between the service fluid pipe and the source of the service fluid for recovering the production fluid from the service fluid pipe.

20. The system of claim 19, wherein the recovery system comprises a cross-over path for diverting production fluid from the service fluid pipe toward the processing or storage location.

21. The system of claim 20, further comprising a valve between the cross-over path and the source of the service fluid, the valve being configured to prevent production fluid from the service fluid pipe flowing to the source.

22. The system of claim 21, wherein the valve is switchable to allow service fluid displaced from the service fluid pipe by the production fluid to return to the source.

23. The system of claim 14, further comprising a controller that is programmed to activate the flow diverter in response to plugging or expected plugging of the flowline pipe.

24. The system of claim 23, wherein the controller is programmed to activate the Dow diverter in response to shutdown or impending shutdown of the flowline pipe.

25. The system of claim 23, wherein the controller is programmed to activate the flow diverter in response to temperature or flowrate of the production fluid in the flowline pipe falling below a threshold value.

26. The system of claim 23, wherein the controller is programmed to deactivate the flow diverter in response to temperature or flowrate of the production fluid in the flowline pipe exceeding a threshold value.

27. The system of claim 14, wherein the flow diverter is located in a subsea wellhead or manifold upstream of the flowline pipe.

28. The system of claim 14, wherein the source of the service fluid and the processing or storage location are situated on a surface installation.

29. The system of claim 14, wherein the flowline pipe and the service fluid pipe are laid on the seabed.

* * * * *